(12) United States Patent
Kaga et al.

(10) Patent No.: US 7,503,862 B2
(45) Date of Patent: Mar. 17, 2009

(54) TRANSMISSION WITH INTERNAL PROTECTIVE SHIELD AND BICYCLE INCORPORATING SAME

(75) Inventors: Hiroyuki Kaga, Saitama (JP); Tatsuro Kimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 556 days.

(21) Appl. No.: 11/236,705

(22) Filed: Sep. 27, 2005

(65) Prior Publication Data

US 2006/0073925 A1 Apr. 6, 2006

(30) Foreign Application Priority Data

Sep. 29, 2004 (JP) ............................. 2004-285494

(51) Int. Cl.
*B62M 9/06* (2006.01)
(52) U.S. Cl. .......................................... 474/78; 474/80
(58) Field of Classification Search .................. 474/78, 474/80, 160; 280/260
See application file for complete search history.

(56) References Cited

U.S. PATENT DOCUMENTS 4,254,639 A * 3/1981 Teramachi .................. 464/167
4,732,051 A * 3/1988 Ozaki et al. ................. 74/594.1
5,738,197 A * 4/1998 Kroger et al. .................. 192/64
5,873,590 A * 2/1999 Abe et al. ..................... 280/259
6,644,452 B2 * 11/2003 Lew et al. ...................... 192/64
2004/0130120 A1 * 7/2004 Matsumoto et al. ......... 280/260
2005/0173890 A1 * 8/2005 Matsumoto et al. ......... 280/261

FOREIGN PATENT DOCUMENTS

JP        2004-155280        6/2004

* cited by examiner

*Primary Examiner*—Bradley T King
*Assistant Examiner*—Stephen Bowes
(74) *Attorney, Agent, or Firm*—Carrier, Blackman & Associates, P.C.; William D. Blackman; Joseph P. Carrier

(57) ABSTRACT

A transmission includes a ball spline mechanism having an outer member which can rotate integrally with an inner member by means of balls housed in guide grooves and which can move in the axial direction; and a derailer which shifts a chain wrapped around a first sprocket moving integrally with the outer member from one transmission sprocket to another among a plurality of operating sprockets. The inner member and the outer member include guide surfaces through which the outer member is guided to move in the axial direction through the balls. The outer member is provided with a dust cover for covering the guide surfaces, regardless of the axial position of the first sprocket.

18 Claims, 8 Drawing Sheets

TRANSMISSION WITH INTERNAL PROTECTIVE SHIELD AND BICYCLE INCORPORATING SAME

CROSS-REFERENCE TO RELATED APPLICATIONS

The present invention claims priority under 35 USC 119 based on Japanese patent application No. 2004-285494, filed on Sep. 29, 2004. The subject matter of this priority document is incorporated by reference herein.

BACKGROUND OF THE INVENTION

1. Field of the Invention

The present invention relates to a transmission equipped with a sliding mechanism that enables a sprocket, around which a chain is wrapped, to move in an axial direction, relative to a shaft on which the sprocket is mounted. The transmission is provided, for example, for bicycles. More particularly, the invention relates to a transmission mechanism of the type having a protection mechanism against foreign objects.

2. Background Art

A transmission in which a gear shift is performed by shifting a chain among a plurality of sprockets includes a transmission for bicycles that is disclosed in Japanese Laid-Open Patent document No. 2004-155280. This transmission includes: a transmission mechanism constituted of a drive sprocket which is coupled to a crankshaft in a driven manner, a plurality of transmission sprockets arranged in the axial direction, and a chain which is wrapped around both one of the plurality of transmission sprockets and the drive sprocket; and a derailer for shifting the chain among the plurality of transmission sprockets. The transmission mechanism and the derailer are housed in a transmission case. When the derailer shifts the chain from one transmission sprocket to another, the chain moves in the axial direction and hence the drive sprocket also moves in the axial direction. Thus, a sliding mechanism is provided between the crankshaft and the drive sprocket, for causing the drive sprocket to rotate integrally with the crankshaft and for enabling the drive sprocket to move along the crankshaft in the axial direction. The sliding mechanism is constituted of a ball spline mechanism which includes an inner cylinder that can rotate integrally with the crankshaft, an outer cylinder with the integrated drive sprocket, and a plurality of balls that are arranged between the inner and outer cylinders. The plurality of balls are housed between a pair of housing grooves respectively formed on the outer side surface of the inner cylinder and the inner side surface of the outer cylinder along the axial direction. The balls come in contact with guide surfaces, which are wall surfaces of the housing grooves of the inner cylinder, and roll. Thus, the balls are guided to the guide surfaces and thereby the drive sprocket moves in the axial direction integrally with the outer cylinder.

In a transmission equipped with sprockets and a chain, the chain is engaged with the sprockets and is brought into contact with a derailer, whereby abrasion powder are generated. The abrasion powder sometimes enters tramsmission grooves. If the abrasion powder attaches to the guide surfaces (wall surfaces) of the grooves of a sliding mechanism, the smooth rolling of balls is inhibited. Thus, the drive sprocket cannot move in the axial direction smoothly. The attachment of abrasion powder to the guide surface of the housing grooves is difficult to identify visually when a transmission mechanism is housed in a case. For this reason, when maintenance is performed, the case must be opened frequently to check the degree of attachment of abrasion powder.

SUMMARY OF THE INVENTION

One objective of the invention is to provide a transmission for a bicycle in which the entry of foreign objects, such as abrasion powder, into the guide surfaces of the sliding mechanism, which enables the first sprocket to move in the axial direction, is inhibited or prevented. The invention thus enables a first sprocket to move in the axial direction more smoothly and to stretch the time between maintenance. Another objective of the invention is to facilitate the attachment of a cover to the outer member. Another objective of the invention is to further reduce the size of the transmission.

Embodiments of the invention may include a transmission having: a sliding mechanism having an inner member capable of rotating integrally with a rotation shaft and an outer member arranged outside of the inner member in a radial direction thereof. The outer member is capable of rotating integrally with the inner member and of moving toward the inner member in an axial direction thereof. A first sprocket moves integrally with the outer member and a plurality of second sprockets are arranged in the axial direction. A shifting mechanism for shifting a chain, wrapped around the first sprocket, from one transmission sprocket to another among the plurality of second sprockets is provided.

In response to the movement of the chain in the axial direction at the time when the shifting mechanism shifts the chain, the first sprocket moves in the axial direction integrally with the outer member. The transmission is characterized in that the inner member includes a guide surface through which the outer member is guided to move in the axial direction, and that the outer member is provided with a dust cover, which covers a region outside of the guide surface in an radial direction thereof no matter what position in the axial direction the outer member is at.

According to this invention, the guide surfaces of the sliding mechanism are covered with the dust cover regardless of the position of the first sprocket that moves in the axial direction. Thus, foreign objects including abrasion powder generated as a result of the engagement of the chain with the sprockets or the contact thereof with the derailer, cannot easily enter the guide surfaces and hence their attachment to the guide surfaces can be inhibited or prevented. Thus, when the chain moves in the axial direction and causes the first sprocket, moving integrally with the outer member, to move in the axial direction, hindrance of the movement of the first sprocket in the axial direction, caused by the foreign objects attached to the guided surfaces can be inhibited or prevented.

In another aspect of the invention the dust cover is formed into a cylinder for substantially surrounding and covering all of the side surfaces of the inner member. The dust cover of the invention may have tapered portions that taper toward their respective axial direction ends.

According to this invention, since the dust cover covers all the side surfaces of the inner member, entry of foreign objects into the guide surfaces can be inhibited or prevented in the entire region of the inner member in a circumferential direction. In addition, since the areas of openings formed in the dust cover are reduced due to the presence of the tapered portions, entry of foreign objects through the openings is inhibited when the dust cover moves in the axial direction integrally with the outer member.

In another aspect of the invention the dust cover is a member separate from the outer member. A cover-side engagement portion is formed on the inner surface of the dust cover, the cover-side engagement portion is engaged with an outer-side engagement portion formed on the outer surface of the outer member. One of the outer-side engagement portion and the cover-side engagement portion can be a convex portion, and the other one of the outer-side engagement portion and the cover-side engagement portion can be a concave portion.

According to other aspects of this invention, the dust cover is attached to the outer member by engaging one of the concave and convex portions with the other one of the concave and convex portions, the one being the cover-side engagement portion formed on the inner surface of the dust cover, and the other one being the outer-side engagement portion formed on the outer surface of the outer member. In addition, extra attachment members are not required for the attachment of the dust cover to the outer member.

In another aspect of the invention the shifting mechanism comprises a guide pulley which guides the chain to a sprocket onto which the chain is shifted, when the chain is intended to be shifted from one transmission sprocket to another among the plurality of second sprockets, and the dust cover is located below the guide pulley; and the guide pulley is located at a position which makes the shortest distance between the guide pulley and the rotational centerline of the rotation shaft smaller than the outer diameter of the first sprocket.

According to this invention, when the chain is shifted among the transmission sprockets, the dust cover inhibits or prevents the entry of abrasion powder falling down from around the guide pulley. This location is where a relatively great amount of abrasion powder could fall into the guide surfaces of the sliding mechanism as a result of the guide pulley making contact with the chain. According to the invention, even when the guide pulley is located at a position which makes the shortest distance between the guide member and the rotational centerline of the rotation shaft to be smaller than the outer diameter of the first sprocket, and when the first sprocket and the guide pulley are juxtaposed to each other, the entry of abrasion powder into the guide surfaces can be inhibited or prevented with a reliability.

Accordingly, through use of the present invention it is possible to stretch the time between maintenance of the transmission because the entry of foreign objects into the guide surfaces is prevented or further inhibited. Accordingly, the first sprocket can move in the axial direction more smoothly and the gears in the transmission can be shifted more smoothly. In some embodiments, since the dust cover is attached to the outer member via the concave-convex engagement using engagement portions formed on the dust cover and the outer member, the attachment of the dust cover is facilitated. In addition, since extra attachment members are not required, the cost for the transmission can be reduced. In some embodiments, the first sprocket and the guide pulley can be juxtaposed closely to each other while ensuring smooth movement of the first sprocket in the axial direction. Thus, it is possible to make the transmission compact.

DETAILED DESCRIPTION OF THE INVENTION

Figure 1:
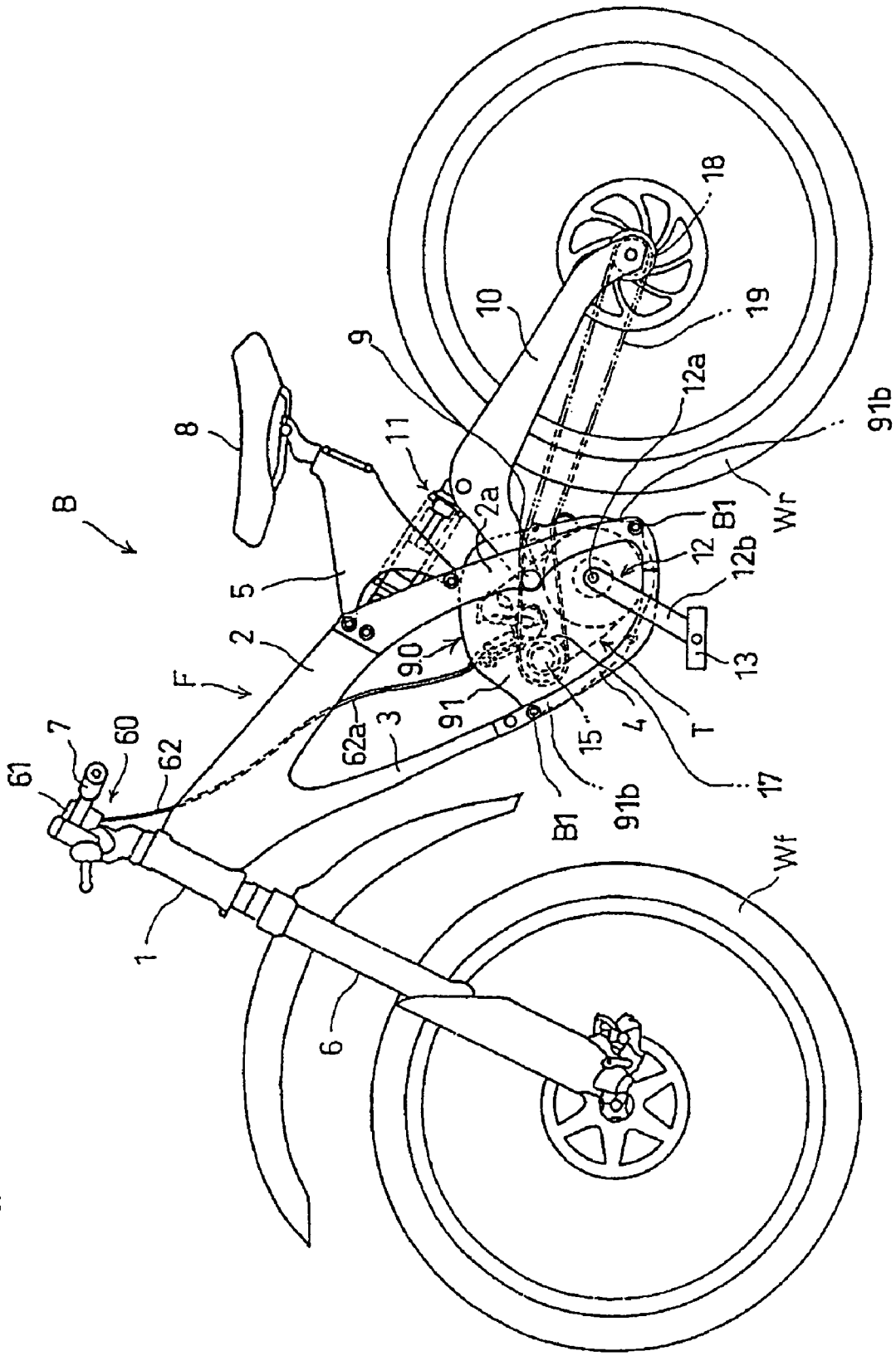
FIG. 1 is a left elevation view schematically showing a bicycle including a transmission.

With reference to FIG. 1, a bicycle B provided with a transmission T to which the present invention is applied includes: a body frame F; a crankshaft 12 mounted with pedals; and a transmission gear including a transmission T, an output shaft 15 which is driven to rotate by power transmitted after a transmission is performed, and a drive-power transmitting mechanism.

The body frame F includes: a head pipe 1 which rotatably supports the shaft of a front wheel Wf in the lower end of the head pipe 1 and steerably supports a front fork 6 having a handlebar 7 at the top of the head pipe 1; a pair of left and right mainframes 2 which obliquely extend from the head pipe 1 downwards to the rear; down tubes 3 which obliquely extend from the front ends of the respective two mainframes 2 downwards to the rear; a pair of left and right under tubes 4 which connect rear ends of the two main frames 2 to rear ends of the down tubes 3; and a saddle frame 5 which extends from each of the main frames 2 to support a saddle 8.

Front ends of a pair of left and right swing arms 10 which rotatably support a shaft of the a rear wheel Wr are swingably supported by a pivot shaft 9 (see also FIG. 3) that is provided commonly to rear portions 2a of the two main frames 2 through an axle shaft attached onto rear ends of the pair of left and right swing arms 10. The two swing arms 10 are joined respectively to the two main frames 2 through a rear suspension 11. Thereby, the two swing arms 10, along with the rear wheel Wr, can swing in an vertical direction with the pivot shaft 9 at the center.

A transmission case 90, a transmission mechanism M1, a derailer 70 of the transmission T, and a crankshaft 12 and an output shaft 15 both of which are rotatably supported by the transmission T, are arranged in a space located at a lower portion of the body frame F, the space being created by the rear portions 2a of the two main frames 2 and the two under tubes 4. In addition, the drive-power transmitting mechanism is arranged on the right side of the body frame F. At this point, when one side of the bicycle B in the vehicle-width direction, i.e., in the left-right direction of the bicycle B, and one side of the bicycle B in the axial direction are defined as their respective left sides, the opposite side of the bicycle B in the vehicle-width direction and the opposite side of the bicycle B in the axial direction are defined as their respective right sides. It should be noted that, in this specification and scope of claim, the terms "axial direction," "radial direction" and "circumferential direction" respectively mean: a direction in which the rotational centerline of a rotation axis or a crankshaft 12 extends; a radial direction about the rotational centerline; and a circumferential direction about the rotational centerline, and the term "viewed from the side" means to be viewed in the axial direction. Furthermore, in the embodiment, positional descriptions of the upper, the lower, the front, the rear, the left and the right respectively match the upper, the lower, the front, the rear, the left and the right of either the bicycle B or a machine, which is equipped with the transmission.

Figure 2:
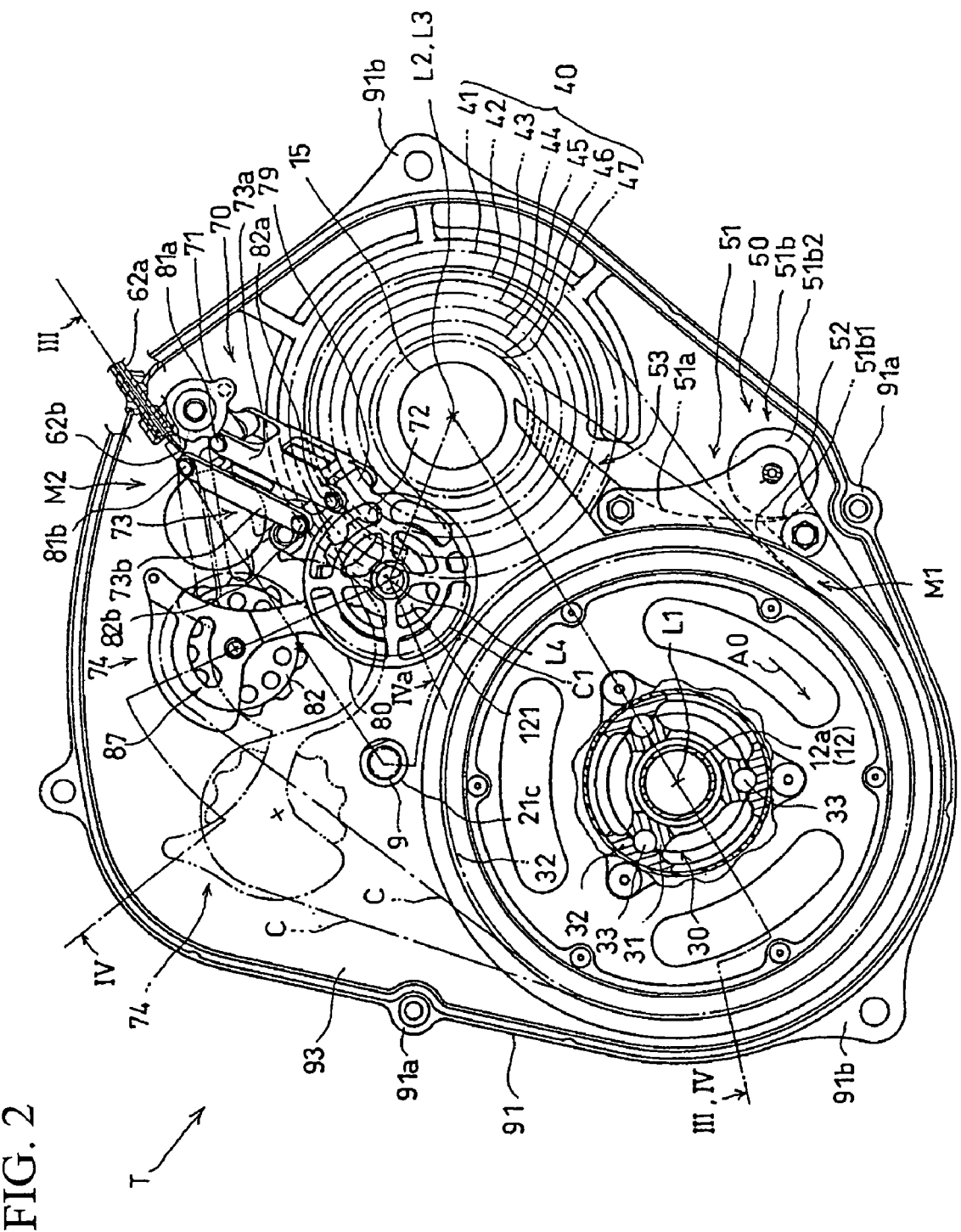
FIG. 2 is a cross-sectional view of the transmission of FIG. 1 without a second case, seen in the direction of arrow II of FIG. 4 and showing a part of the transmission which is taken along the II-II line in FIG. 5.

With reference also to FIG. 2, the transmission T includes a metallic transmission case 90 which is constituted of a pair of left and right cases being a first case 91 as the left case and a second case 92 as the right case, whereby an enclosed, or almost enclosed inside compartment 93 is formed. The cases 91 and 92 are joined together with bolts (not shown) at two bosses. FIG. 2 shows a boss 91a of the first case 91 formed in the peripheral portions thereof. The metallic transmission case 90 is fixed to each of the two main frames 2 and to each of the two under tubes 4 with bolts B1 at a pair of attachment portions. FIGS. 1 and 2 show the attachment portion 91b of the first case 91 formed in the peripheral portions respectively of the cases 91 and 92.

Figure 3:
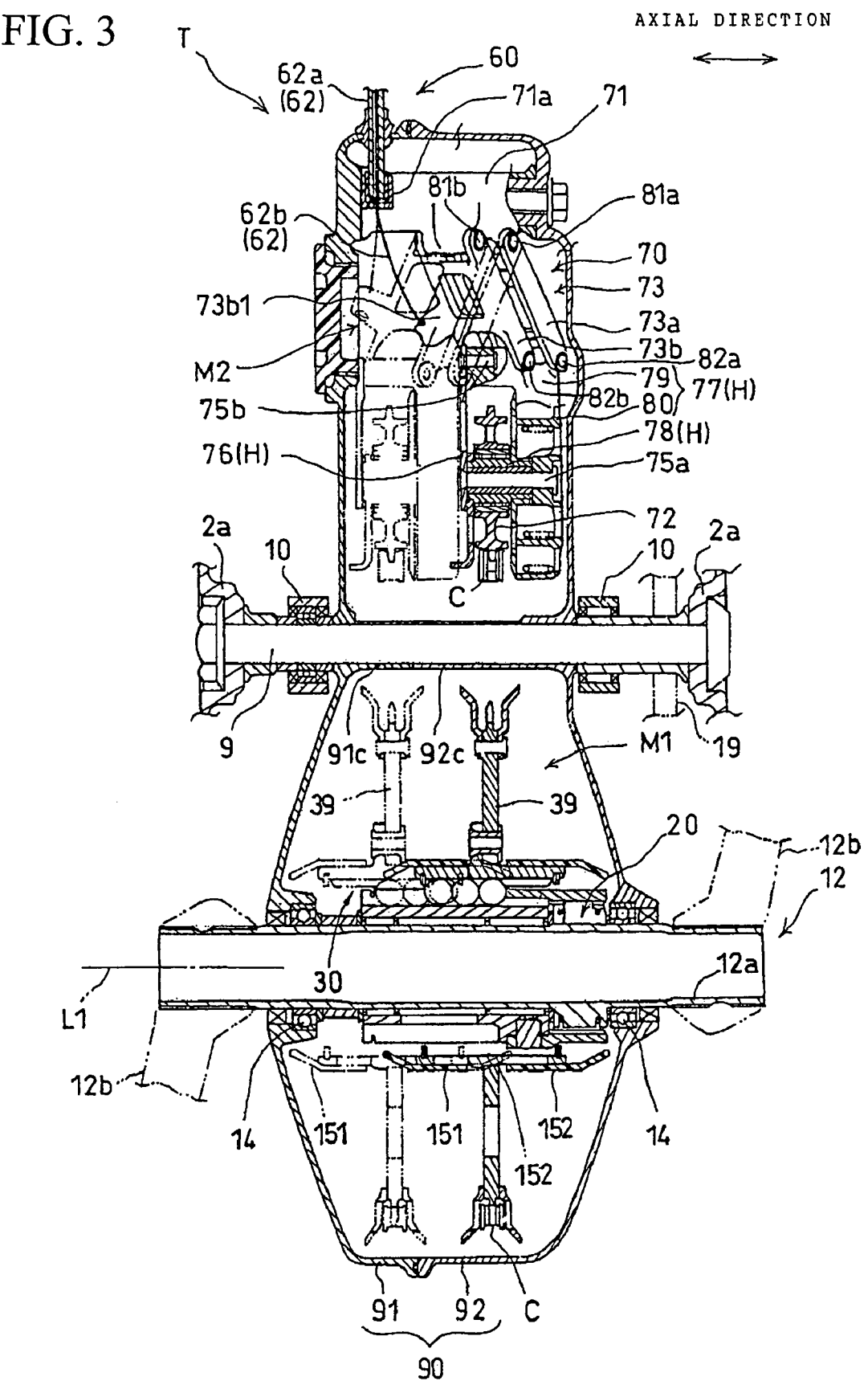
FIG. 3 is a cross-sectional view taken along the III-III line in FIG. 2, and shows a cross-section of a part of a derailer.
Figure 4:
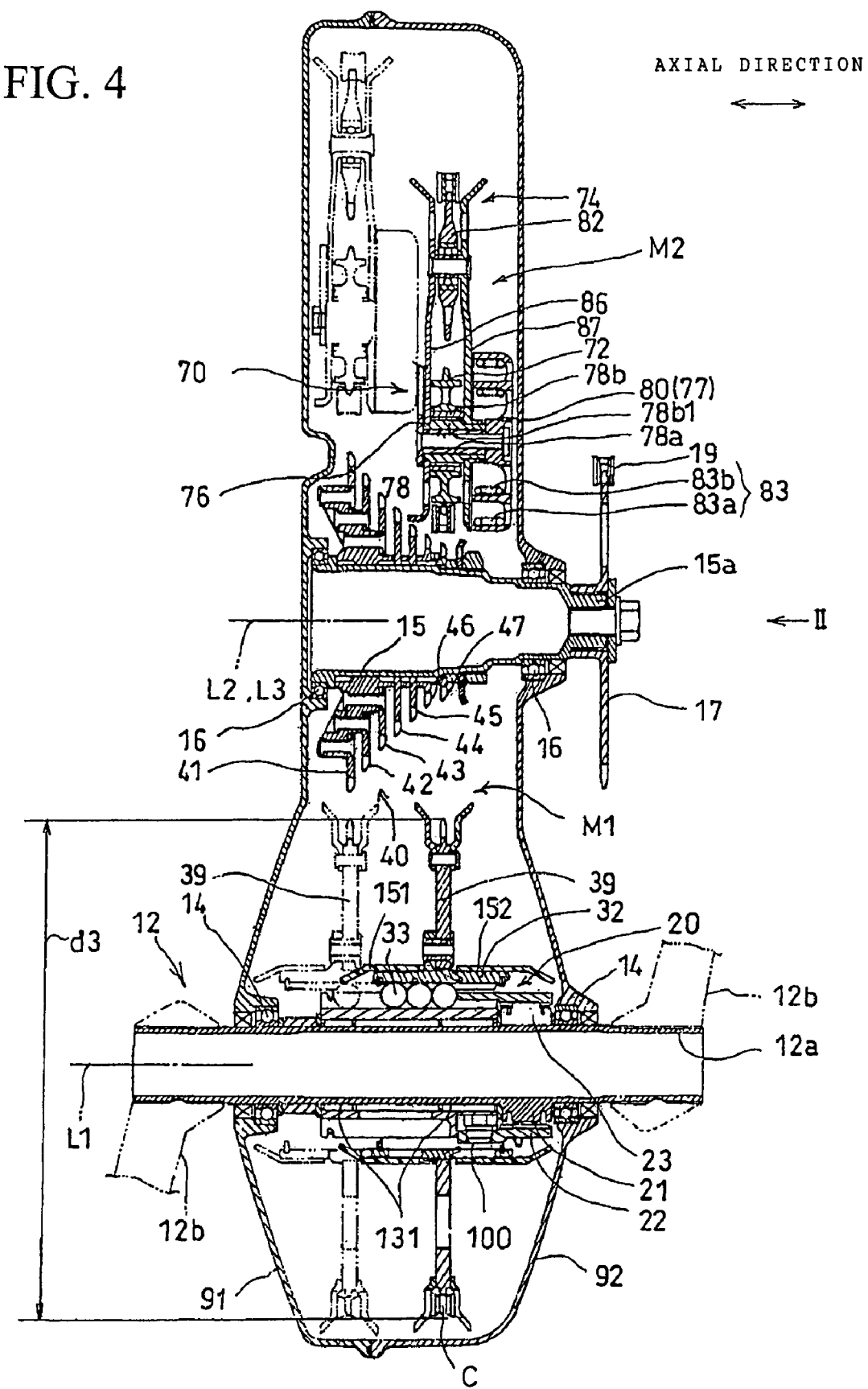
FIG. 4 is a cross-sectional view taken along the IV-IV line in FIG. 2, and shows a cross-sectional view of a part of the derailer which is taken along the IVa line.

With reference also to FIGS. 3 and 4, the crankshaft 12, which can be driven to rotate by a rider and receive drive torque, includes a main shaft 12a arranged so as to penetrate through the lower portion of the transmission case 90 in the left-right direction, and a pair of crank arms 12b which are jointed respectively to the left and right ends of the main shaft 12a protruding from the transmission case 90. The main shaft 12a is rotatably supported by the first and second cases 91 and 92 with a pair of bearings 14. In addition, a pedal 13 (FIG. 1) is rotatably mounted onto each of the crank arms 12b.

The output shaft 15 is arranged in a position forward, and obliquely upward, from the main shaft 12a in the following manner: a rotational centerline L2 of the output shaft 15 and a swing centerline of each of the swing arms 10 are in parallel with each other; the rotational centerline L2 of the output shaft 15 and the swing centerline of each of the swing arms 10 are concurrently in parallel with the rotational centerline L1 of the crankshaft 12; and the rotational centerline L2 of the output shaft 15 and the swing centerline of each of the swing arms 10 are within a rotation track of the crank arm 12b. The pivot shaft 9 is arranged in a position substantially right above the main shaft 12a in the same manner as the output shaft 15. The pivot shaft 9 fixed to the main frames 2 is inserted into through holes created in bosses 91e and 92e which are respectively formed in the first case and the second case 91 and 92 and protrude toward the inside compartment 93, and the pivot shaft 9 supports the first and second cases 91 and 92.

With reference to FIG. 4, the output shaft 15 housed in the transmission case 90 includes an end 15a protruding rightwards from the second case 92. A drive sprocket 17 which is a drive body of rotation for torque output, is joined to the end 15a. With reference also to FIG. 1, a chain 19 which is a flexible endless drive belt for torque output, is wrapped around both the drive sprocket 17 and an output driven sprocket 18 which is a driven body of rotation coupled to the rear wheel Wr. The drive sprocket 17, the chain 19 and the driven sprocket 18 comprise the drive-power transmitting mechanism for driving the rear wheel Wr, which is the drive wheel.

With reference to FIGS. 2 to 4, the transmission T includes: a transmission mechanism M1 using a chain C; a transmission switching mechanism M2 which moves the transmission mechanism M1 to a desired gear position according to a shift operation; and the transmission case 90 for housing a derailer 70, further described below, which is a component of the transmission T and the transmission switching mechanism M2.

The transmission mechanism M1 includes: a one-direction clutch 20; a ball spline mechanism 30 which is a sliding mechanism; a first sprocket 39; a plurality of transmission sprockets 41 to 47 which are driven sprockets; an endless chain C; and a chain guide member 50. The first sprocket 39 is arranged to be coaxial with the main shaft 12a of the crankshaft 12 and coupled to the crankshaft 12 via the one-direction clutch 20 and the ball spline mechanism 30 in a driven manner.

Figure 5:
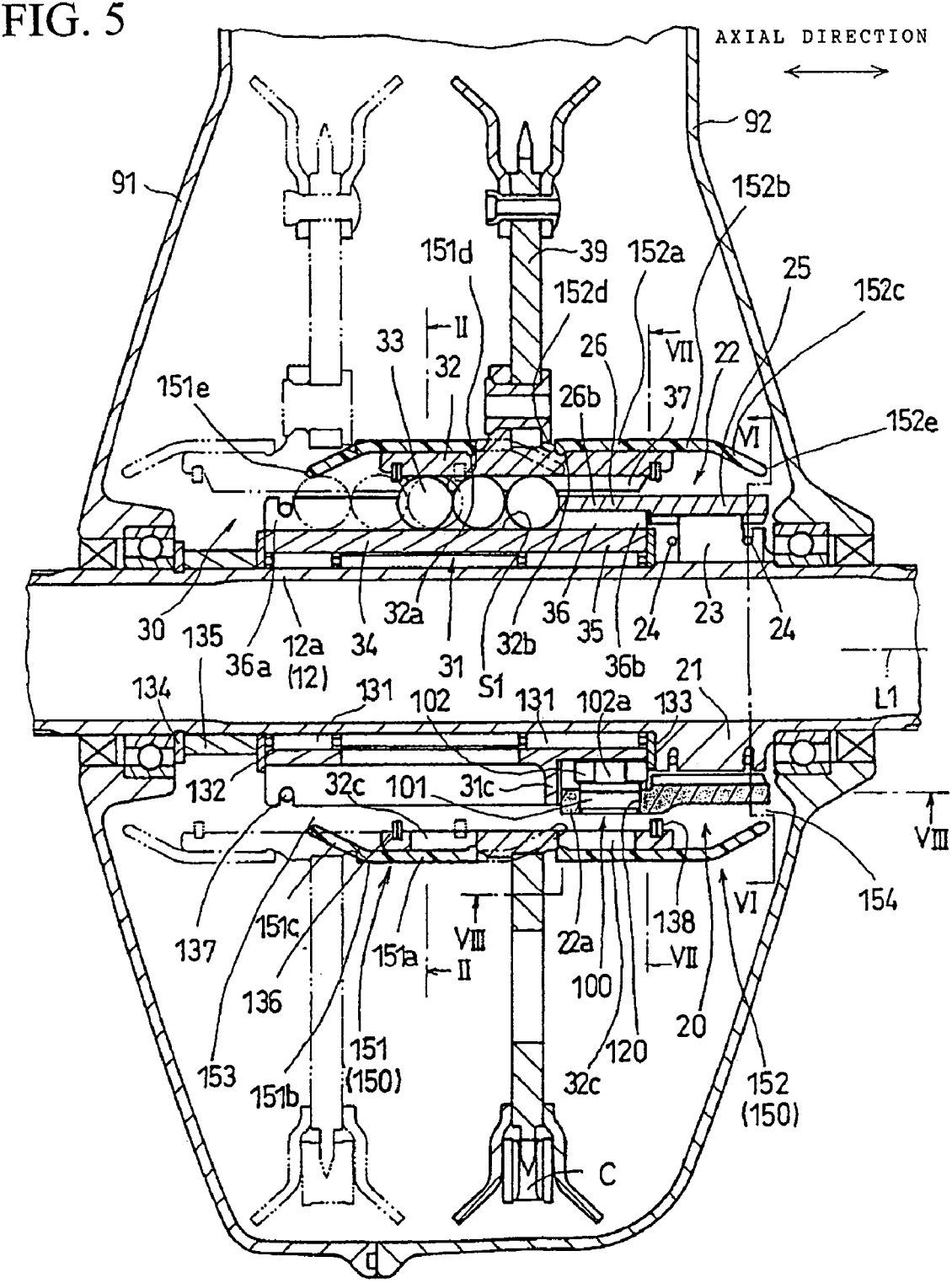
FIG. 5 is an enlarged view showing the principal portion shown in FIG. 3.
Figure 6:
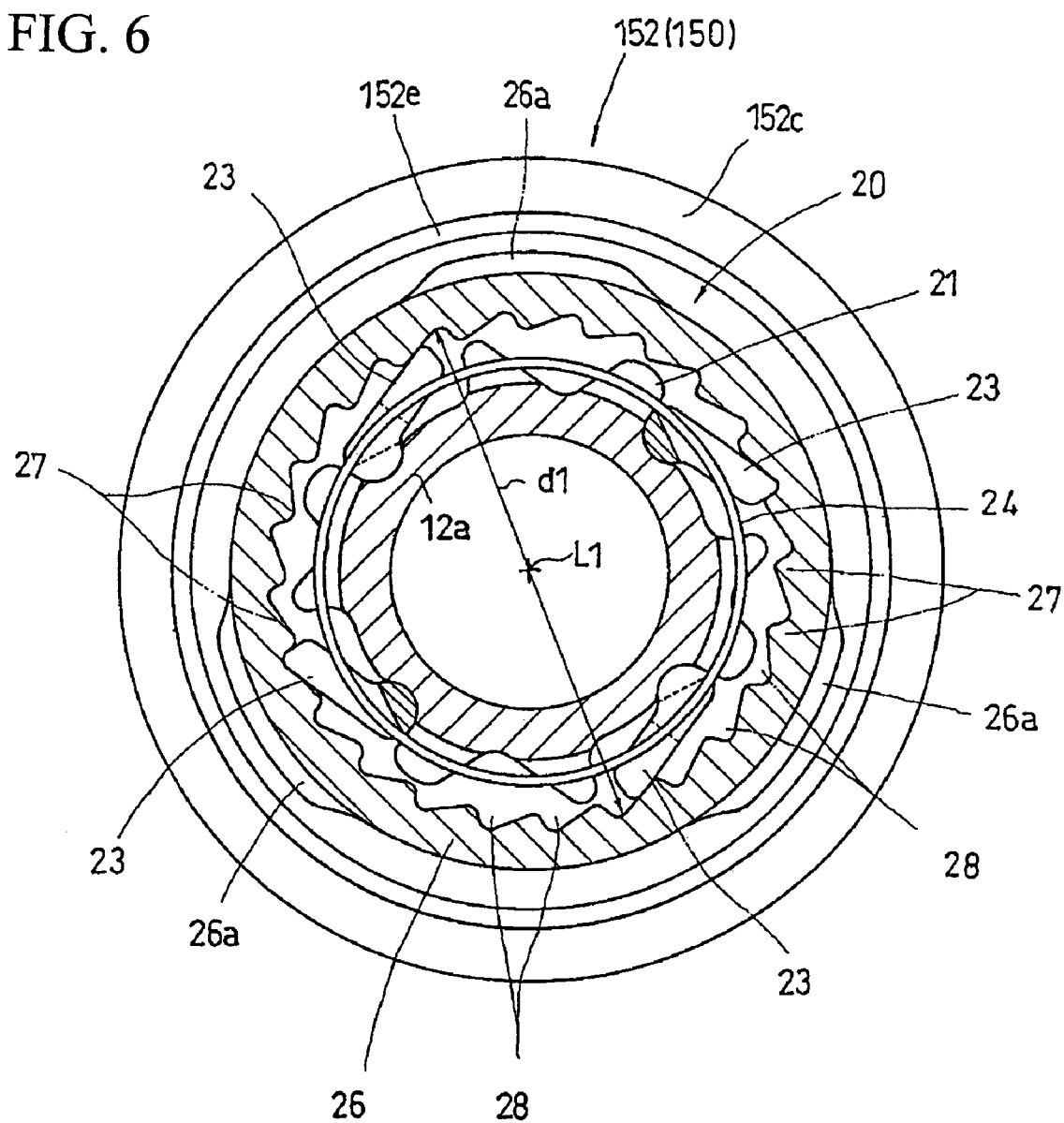
FIG. 6 is a cross-sectional view taken along the VI-VI line in FIG. 5.
Figure 7:
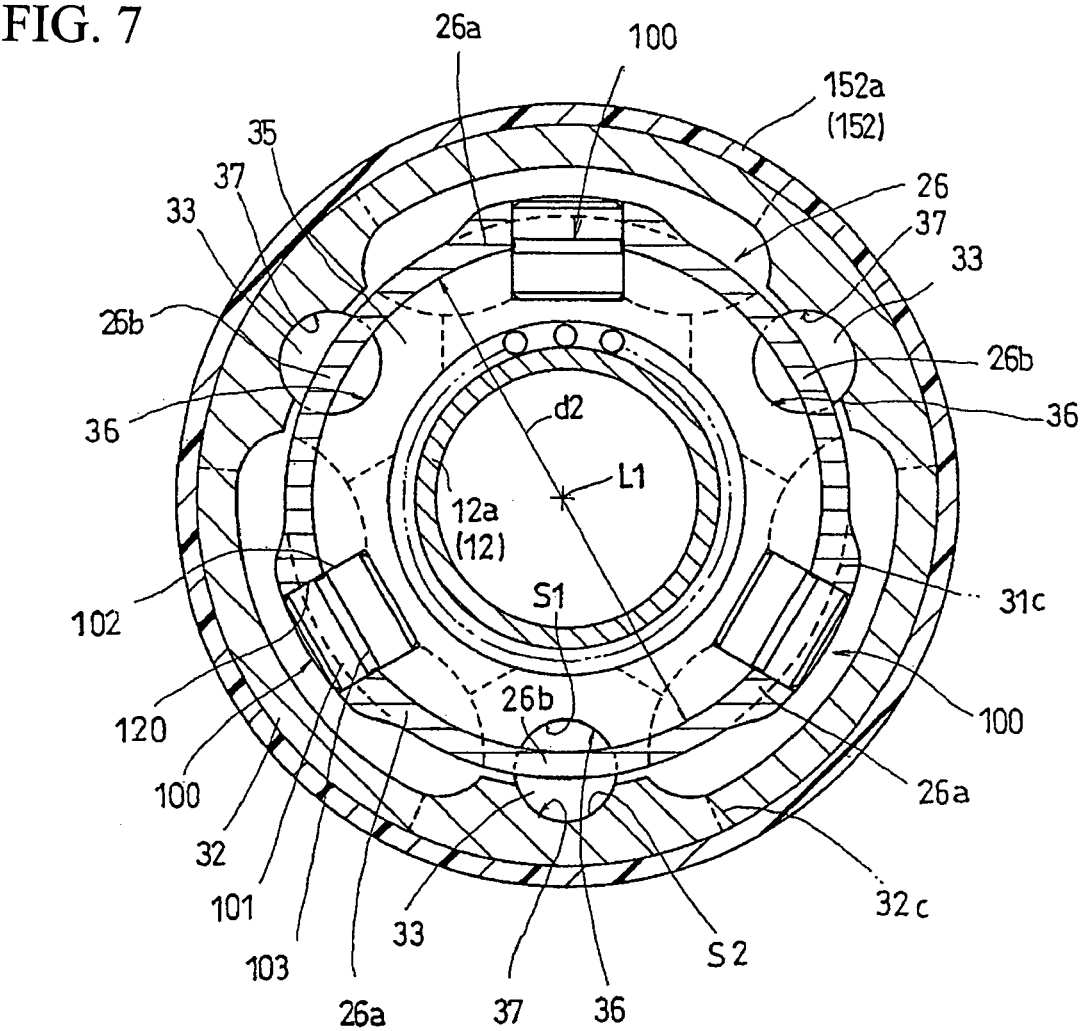
FIG. 7 is a cross-sectional view taken along the VII-VII line in FIG. 5.
Figure 8:
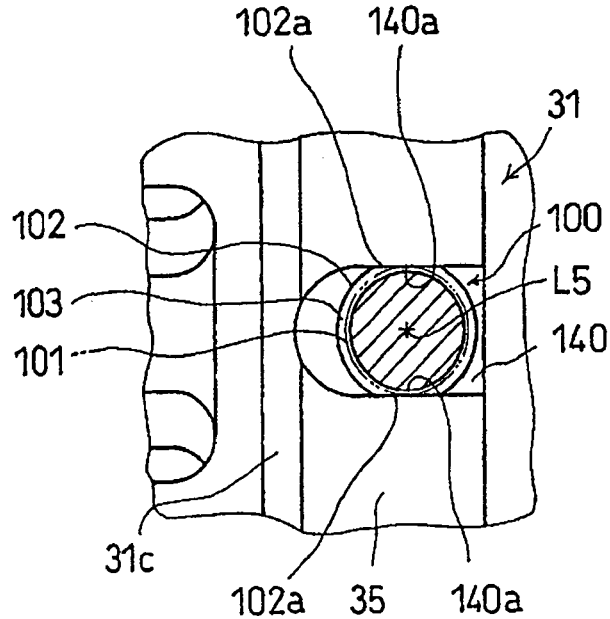
FIG. 8 is a cross-sectional view taken along the VIII-VIII line in FIG. 5.
Figure 9:
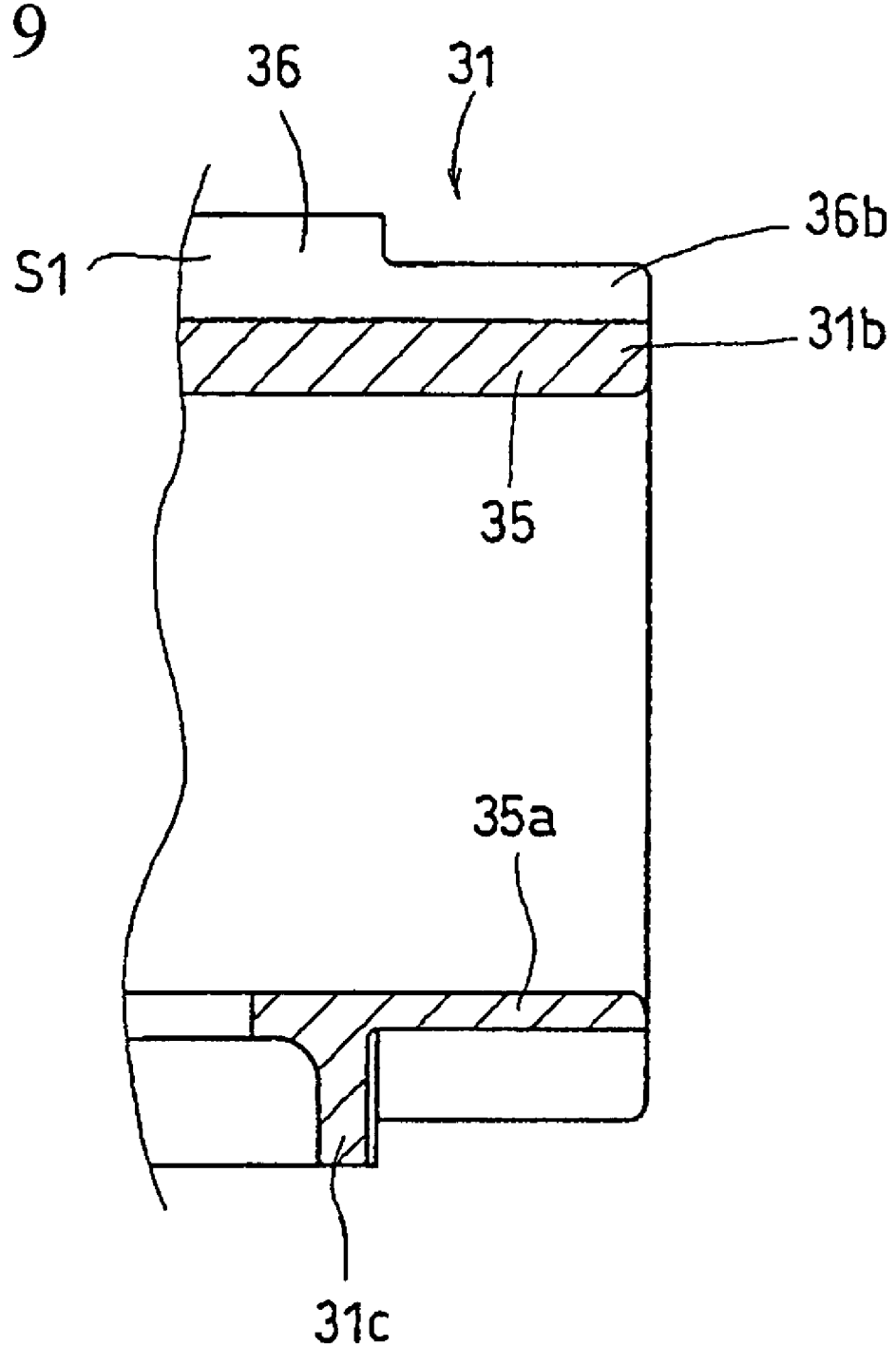
FIG. 9 is a cross-sectional view, taken along the III-III line in FIG. 2, showing the principal portion of an inner cylinder of a ball spline mechanism.

With reference to FIGS. 5 to 7, the one-direction clutch 20 includes: a clutch inner body 21 which can rotate integrally with the crankshaft 12; a cylindrical clutch outer body 22 arranged outside of the clutch inner body 21 in a radial direction thereof; a plurality of claws 23 as clutch components arranged between the clutch inner body 21 and the clutch outer body 22; and ring-shaped springs 24 which are elastic members that impart a spring force to the claws 23 so that they come in contact with a plurality of ratchet teeth 27 with which the clutch outer body 22 is engaged.

Only when the crankshaft 12 rotates in a direction AO in which the crankshaft 12 makes the forward rotation, is the clutch outer body 22 coupled to the crutch inner 21 via the claws 23 and rotates integrally with the crutch inner 21. The one-direction clutch 20, therefore, transmits only the forward rotation of the crankshaft 12 or torque, to the first sprocket 39, i.e., the first drive sprocket, via the ball spline mechanism 30.

The clutch inner body 21 is integrally molded with the main shaft 12a and swingably supports the claws 23. The clutch outer body 22 includes: a cylindrical main body 25 whose inner side surface has the plurality of saw-tooth ratchet teeth 27 with which the claws 23 are engaged, and a cylindrical clutch-side clutch-side overlapped portion 26 which is arranged next to the main body 25 in the axial direction and is overlapped with the ball spline mechanism 30 when viewed in the axial direction.

The maximum inner diameter d1 of the main body 25 (FIG. 6) is smaller than or equal to the minimum inner diameter d2 of the clutch-side overlapped portion 26 (FIG. 7). Each of the ratchet teeth 27 lies at a position radially inward of the inner side surface of the clutch-side overlapped portion 26. The plurality of ratchet teeth 27 are formed of a plurality of grooves 28 that are formed on the inner side surface of the main body 25 and extend along the axial direction, each of the grooves 28 having open ends pointing in the axial direction. To be more specific, the plurality of ratchet teeth 27 are formed by performing mechanical processing, preferably broaching, on the inner side surface of the main body 25 to form the grooves 28 substantially throughout the axial width of the inner surface of the main body 25. Thus, the grooves 28 are formed between the ratchet teeth 27 that are adjacent to each other in the circumferential direction. Therefore, the main body 25 has a maximum diameter smaller than the minimum diameter d2 before the ratchet teeth 27 are formed, that is, before mechanical processing such as broaching is performed.

The ball spline mechanism 30, arranged together with the one-direction clutch 20 in the torque transmission path that is provided between the crankshaft 12 and the first sprocket 39. The ball spline mechanism 30 includes: a cylindrical inner member 31 which can rotate integrally with the clutch outer body 22, a cylindrical outer member 32 which is an outer member arranged outside of the inner member 31 in a radial direction thereof and which moves integrally with the first sprocket 39; and a plurality of balls 33 which are coupling elements arranged between the inner member 31 and the outer member 32 in the radial direction to connect the outer member 32 to the inner member 31 so that the outer member 32 can rotate integrally with the inner member 31 and move in the axial direction. Accordingly, the outer member 32 is coupled to the inner member 31 so that it can rotate integrally with the inner member 31 and also move in the axial direction via the plurality of balls 33.

With reference also to FIG. 2, the inner member 31, composed of a member separate from the clutch outer body 22, is rotatably supported at the outer side surface of the main shaft 12a with bearings 131 and coupled via coupling pins 100 to the clutch outer body 22 so as to be rotatable integrally therewith. The inner member 31 includes a main body 34 that supports the balls 33 so as to be movable in the axial direction, and a slide-side slide-side overlapped portion 35 which is arranged next to the main body 34 in the axial direction and which is overlapped with the clutch-side overlapped portion 26 in the axial direction. The inner member 31 is a one-piece member that has the integrally-molded main body 34 and slide-side overlapped portion 35.

Using circular rings 132 and 133, the inner member 31 is supported by the main shaft 12a so as not to be movable in the axial direction. The circular rings 132 and 133 constitute a pair of thrust bearings that are respectively brought in contact with and attached to the both axial ends of the main shaft 12a so as not to be movable in the axial direction. One ring, which is the ring 132, comes in contact with a collar 135 that comes in contact with a snap ring 134 fitting into circular grooves provided in the main shaft 12a, whereas the other ring, the ring 133, comes in contact with the clutch inner body 21. In that way, movement of the rings 132 and 133 in the axial direction is limited. Meanwhile, the first sprocket 39 is coupled integrally to the outer member 32 with rivets.

A plurality of guide grooves 36, three in this embodiment, are formed in the outer side surface of the inner member 31 in the axial width direction to extend along the axial direction, while regular spaces are provided between them along the circumferential direction. The guide grooves 36 serve to house and support the balls 33 so as to be rollable, and guide them so that they cannot move in the circumferential direction but can move in the axial direction. Moreover, the inner side surface of the outer member 32 is provided with as many guide grooves 37 as the guide grooves 36 at given intervals in the circumferential direction, so that they may face the guide grooves 36 in the radial direction and extend along the axial direction. Like the guide grooves 36, each of the guide grooves 37 serves to house and support the balls 33 so as to be rollable, and guide them so that they cannot move in the circumferential direction but can move in the axial direction. A ball line constituted of a plurality of the balls 33 is housed between a pair of guide grooves 36 and 37, respectively constituted of the guide groove 36 formed in the inner member 31 and the guide groove 37 formed in the outer member 32, which face each other in the radial direction.

The guide grooves 36 and 37 have their respective open ends 36a and 36b pointing in the axial direction. The outer side surface of the inner member 31 and the inner side surface of the outer member 32 are subjected to mechanical processing, preferably broaching, to form the guide grooves 36 and the guide grooves 37. Thereby, in the inner member 31, the guide grooves 36 and the later-described guide surfaces S1 and S2 are formed over the main body 34 and the slide-side overlapped portion 35.

Each of the guide grooves 36 and 37 has a wall surface constituted of a part of a surface of a cylinder, and therefore the guide surfaces through which the balls 33 roll and are guided to move in the axial direction are formed. For this reason, either the guide grooves 36 and 37 or the guide surfaces S1 and S2 guide the balls 33 so as to move along the axial direction. In that way the outer member 32 and the first sprocket 39 are guided so that they can move along the axial direction.

The ball spline mechanism 30 is provided with a pair of inner side-stopper portions 26b and 137 and a pair of outer-side stopper portions 136 and 138, which serve to prevent the balls 33 from moving beyond a predetermined movement range, which in turn prevent the outer member 32 and the first sprocket 39 from moving in the axial direction beyond a predetermined movement range. Herein the term "predetermined movement range," hereinafter simply referred to as "movement range," means a range in which the first sprocket 39 moves in the axial direction in response to either a later-described guide pulley 72, which moves within a range in which the derailer swings, or the chain C.

To be more specific, it is the stopper portions 26b and 136 that prevent the outer member 32 and the first sprocket 39 from moving rightwards beyond the movement range. The stopper portions 26b and 136 are constituted of a part of the clutch-side overlapped portion 26 of the clutch outer body 22 and the snap ring equipped to the outer member 32, respectively. In addition, it is the stopper portions 137 and 138 that prevent the outer member 32 and the first sprocket 39 from moving leftwards beyond the movement range, the stopper portions 137 and 138 constituted of the snap ring equipped to the inner member 31 and the snap ring equipped to the outer member 32, respectively. Thus, in the inner member 31, the balls 33 can move in axial direction within either the guide grooves 36 or the guide surfaces S1, on a part of the main body 34.

With reference to FIG. 5 and FIGS. 7 to 9, the clutch outer body 22 and the inner member 31 are coupled to each other at the overlapped portions 26 and 35 by means of the coupling pins 100, which are coupling members, so that they can rotate integrally. The clutch-side overlapped portion 26 includes a left end 22a of the clutch outer body 22. The slide-side overlapped portion 35 includes a right end 31b of the inner member 31.

The clutch-side overlapped portion 26 is arranged between the slide-side overlapped portion 35 and the outer member 32 in order that it can overlap with the guide surfaces S1 or the guide grooves 36 when viewed in the axial direction. The slide-side overlapped portion 35 is arranged at a position radially inward of the outer member 32, whereas the outer member 32 is arranged outside of the slide-side overlapped portion 35 in the radial position. To be more specific, the clutch-side overlapped portion 26 includes: coupling portions 26a to be provided with the coupling pins 100; and the stopper portion 26b that faces the guide grooves 36 or the guide surfaces S1 in the radial direction. The coupling portions 26a, into which later-described insertion holes 120 are formed, have another role as a positioning portion that comes in contact with an abutting portion 31c, which is formed between the guide grooves 36 integrally molded with the main body 34 of the inner member 31 and adjacent to each other in the circumferential direction. Specifically, the coupling portion 26a lies between the stopper portions 26b that are adjacent to each other in the circumferential direction, and makes contact with the abutting portion 31c, thereby determining the axial position of each of the stopper portions 26b in the cylinder 31 as well as the axial position of the clutch outer body 22. The stopper portions 26b are arranged to overlap in the axial direction with portions of the slide-side overlapped portion 35 within either the guide grooves 36 or the guide surfaces S1. The stopper portions 26b come in contact with the balls in the guide grooves 36 and limit the movement of the balls 33 in the axial direction. In this way, the stopper portions 26b prevent the outer member 32 and the first sprocket 39 from moving in the axial direction beyond the predetermined movement range, as well as prevent the balls 33 from falling off from the guide grooves 36.

Each of the coupling pins 100 includes a clutch-side insertion portion 101 and a slide-side insertion portion 102. The clutch-side insertion portion 101 is inserted into the insertion hole 120, which is a round hole clutch-side insertion space formed in the coupling portion 26a. The slide-side insertion portion 102 is inserted into a slit 140, which is a slide-side insertion space formed in the slide-side overlapped portion 35. The coupling pin 100 is a cylindrical pin, a part of which has a different diameter from the other parts thereof along the axis of the coupling pin 100. The insertion portion 101 is constituted of a small-diameter part, and the insertion portion 102 is constituted of a large-diameter part having a diameter larger than the diameters of the insertion portion 101 and the insertion hole 120. In the coupling pin 100, a step 103, which cannot be inserted into the insertion hole 120 and constitutes a part of the insertion portion 102, is formed near the insertion 101. In addition, the coupling pin 100 has contact plane surfaces 102a, which are a pair of pin-side contact surfaces facing each other in the radial direction across the axis of the coupling pin 100. The contact plane surfaces 102a are planes symmetrical about the plane including the axis L5 and are in parallel with each other.

The slit 140 is a groove with a bottom wall 35a formed in the axial end of the slide-side overlapped portion 35 and has open ends pointing in the axial direction. The slit 140 has contact plane surfaces 140a, which are a pair of slide-side contact surfaces out of the wall surfaces defining the slit 140, and which face each other in the circumferential direction. The distance between the parallel contact plane surfaces 140a equals the outer diameter of the insertion portion 101 as well as to the distance between the contact plane surfaces 102a. It should be noted that the distance between the contact plane surfaces 102a may be larger than the outer diameter of the insertion portion 101. The pair of contact plane surfaces 102a make contact with the pair of contact plane surfaces 140a when the insertion portion 102 is inserted into the slit 140.

Then, the clutch outer body 22 and the inner member 31 are coupled with each other by the coupling pins 100 in the following manner. First, the insertion portions 101 are inserted into the insertion holes 120 having a diameter almost equal to the outer diameter of the insertion portion 101. Subsequently, the coupling pins 100 are aligned to have the contact plane surfaces 102a parallel with each other along the axial direction, and thus are held by the clutch outer body 22. Thereafter, each of the coupling pins 100 that are integral with the clutch outer body 22 is inserted into the slit 140 in the axial direction while the contact plane surface 102a of the coupling pin 100 are caused to come in contact with the contact plane surface 140a of the inner member 31. The one-direction clutch 20 and the ball spline mechanism 30 are then attached to the main shaft 12a. When the outer 22, the inner member 31 and the outer member 32 are arranged so as to be coaxial with the main shaft 12a, a ring 133 (FIG. 5) attached to the right end of each of the coupling pins 100 prevents the coupling pins 100 from being pulled out of the slits 140 in the axial direction.

Accordingly, through the balls 33, the outer member 32 and the first sprocket 39 can rotate integrally both with the crankshaft 12 and with the inner member 31 immovable in the axial direction, and movable in the axial direction. Then, the crankshaft 12, the one-direction clutch 20, the ball spline mechanism 30 and the first sprocket 39 constitute a torque transmission mechanism by which torque, applied to the crankshaft 12 when a rider pedals, is transmitted to the first sprocket 39.

With reference to FIG. 2 and FIGS. 5 to 7, the outer member 32 is provided with a dust cover 150 which covers, regardless of the axial positions of the outer member 32 and the first sprocket 39, a region outside of the guide surfaces S1 and S2 in radial directions thereof. The guide surfaces S1 and S2 are respectively of the guide grooves 36 and 37 having respective open ends pointing in the radial direction. The dust cover 150 has protruding portions 151b and 152b that respectively extend from either ends of the outer member 32 in the axial direction. These protruding portions 151b and 152b are respectively provided with tapered portions 151c and 152c that taper toward their respective axial ends 151e and 152e. The interval between the ends 151e and 152e in the axial direction, i.e. the axial range in which the dust cover 150 covers either the guide grooves 36 and 37 or the guide surfaces S1 and S2, is selected so that, when the first sprocket 39 moves within the movement range with the outer member 32, the dust cover 150 can always cover substantially all the regions where the balls 33 move. In the dust cover 150, the ends 151e and 152e define openings 153 and 154, respectively, and the provision of the tapered portions 151c and 152c reduces the areas of the openings 153 and 154 compared to those without the tapered portions 151c and 152c.

The dust cover 150 is constituted of a pair of first and second covers 151 and 152, which are arranged on the outer side surface of the outer member 32 and which sandwich the first sprocket 39 therebetween in the axial direction. Each of the covers 151 and 152, which is a member separate from the outer member 32, is formed into a hole-less cylinder in a tubular shape for covering the entire side surface of the inner member 31. The cover 151 includes: a base portion 151a, which comes in contact with the outer side surface of the outer member 32 for covering the outer member 32; and a protruding portion 151b coupled to the base portion 151a. The cover 152 includes: a base portion 152a, which comes in contact with the outer side surface of the outer member 32 for covering the outer member 32; and a protruding portion 152b coupled to the base portion 152a.

Each of the covers 151 and 152 is desirably made of synthetic resin, and is held by the outer member 32 with holding structure. The holding structure is constituted of: convex portions 151d and 152d, which are cover-side engagement portions respectively formed in the inner side surfaces of the base portions 151a and 152a of the covers 151 and 152, respectively, and concave portions 32a and 32b, which are outer-side engagement portions formed in the outer side surface of the outer member 32. The convex portion 151d is constituted of an annular protrusion, which is formed in the end portion on the side of the base portion 151a of the axial ends of the cover 151 and extends in the circumferential direction. The concave portion 32a is formed of a groove, which extends in the circumferential direction and is formed in a position determined in a manner enabling the opening 32c, formed for the purpose of reducing the weight of the outer member 32, to be entirely covered with the first cover 151. The convex 152d is constituted of an annular protrusion, which is formed in the end portion on the side of the base portion 152a of the axial ends of the cover 152 and extends in the circumferential direction. The concave portion 32b is formed of a groove, which extends in the circumferential direction and is formed in a position determined in a manner enabling the opening 32c, formed for the purpose of reducing the weight of the outer member 32, to be entirely covered with the second cover 152. The convex portion 151d is engaged with the concave portion 32a, and the convex 152d is engaged with the concave portion 32b. In this way, the covers 151 and 152 are attached to the outer member 32. Moreover, both the first and second covers 151 and 152 lie in positions below the later-described guide pulley 72 of the derailer 70.

With reference to FIGS. 2 and 4, the output shaft 15 is rotatably supported by the transmission case 90 by way of a pair of bearings 16 held respectively by the cases 91 and 92. A sprocket cluster 40 is constituted of a plurality of sprockets which are different from one another in outer diameter (in other words, diameter of an addendum circle of a sprocket) and in number of teeth. In this embodiment, the sprocket cluster 40 is constituted of 7 transmission sprockets 41 to 47. Here, using splines, the sprocket cluster 40 is joined with the output shaft 15 so that the sprocket cluster 40 can rotate integrally with the output shaft 15 and so that the sprocket cluster 40 can be arranged coaxially with the output shaft 15. For this reason, a rotational centerline L3 common to the transmission sprockets 41 to 47 matches a rotational centerline L2 of the output shaft 15, which is in parallel with the rotational centerline L1 of the crankshaft 12. The transmission sprockets 41 to 47 are sequentially arranged in order that, the transmission sprocket for the lower speed can be located more closely toward the second case 90, from the transmission sprocket 41 for the first-speed as the minimum speed, to the transmission sprocket 47 for the seventh-speed as the maximum speed.

With reference also to FIG. 3, the chain C is wrapped around the first sprocket 39 and an operation sprocket which is one of the transmission sprockets 41 to 47 to be selected out of the sprocket cluster 40 by use of the transmission switching mechanism M2 (hereinafter, referred to simply as an "operation sprocket." In FIGS. 2 to 4 either the sprocket 41 or the sprocket 47 is selected as the operation sprocket. The output shaft 15 is then driven to rotate by the crankshaft 12 at a gear ratio determined by the first sprocket 39 and the operation sprocket which is coupled to the first sprocket 39 through the chain C in a driven manner.

With reference to FIG. 2, the chain guide member 50 is arranged in a position on the tension side of the chain C which is driven by the forward rotation of the crankshaft 12. The chain guide member 50 constitutes chain-jamming prevention structure for preventing the sagging chain C from being jammed between the first sprocket 39 and the transmission case 90 when a sag in the chain C owing to a decrease of the tension occurs on the tension side.

The chain guide member 50 includes a guide portion 51 and a regulation portion 53. The guide portion 51 forms an opening 52 having a width slightly larger than that of the sprocket cluster 40 in its axial direction. The regulation portion 53 limits the chain C movement toward the inside of its orbit, when the chain C is pulled out from one of the transmission sprockets 41 to 47. For the sagging chain C to be guided in an arranged manner in the opening 52, the guide portion 51 includes an inner guide portion 51a and an outer guide portion 51b. The inner guide portion 51a is arranged in a position toward the inside of the chain orbit from the opening 52, and the outer guide portion 51b is arranged in a position toward the outside of the chain orbit from the opening 52 and has a outer guide portion 51b1 and a roller 51b2.

With reference to FIGS. 1 to 4, the transmission switching mechanism M2 includes a transmission operation mechanism 60 and the derailer 70. The derailer 70 is a shifting mechanism for shifting the chain C in the sprocket cluster 40 in response to a shift operation by the transmission operation mechanism 60. The chain C is wrapped around the first sprocket 39, the operation sprocket, a guide pulley 72 and a tension pulley 82. The guide pulley 72 and the tension pulley 82, which will be both described later, are both arranged in a sagging portion of the chain C that is driven by the forward rotation of the crankshaft 12.

The transmission operation mechanism 60, coupled to the derailer 70 in the inside compartment 93 of the transmission case 90, includes a transmission operation member 61 (FIG. 1) and an operation cable 62. The transmission operation member 61 is constituted of a shift lever or the like, which is operated by a rider. The operation cable 62 is an operating force transmission member for operationally coupling the transmission operation member 61 with the derailer 70 in order to transmit the action of the transmission operation member 61 to the derailer 70. The operation cable 62 is constituted of an outer cable 62a and an inner cable 62b. The outer cable 62a has a tubular shape and is held by the body frame F and the transmission case 90. The inner cable 62b is inserted inside the outer cable 62a. One end of the inner cable 62b is coupled to the transmission operation member 61 whereas the other end thereof is coupled to the derailer 70.

With reference to FIGS. 2 to 4, the derailer 70, which is arranged above the main shaft 12a of the crankshaft 12 and is operated by the operation cable 62 to shift the chain C wrapped around the first sprocket 39 among the transmission sprockets 41 to 47, includes: a cylindrical base portion 71; the guide pulley 72; a holder H; a parallel link mechanism 73; and a tensioner 74. The base portion 71 is fixed to and held by the cases 91 and 92, and is provided with a holding portion 71a for the outer cable 62a. The guide pulley 72 is a guide member for guiding the chain C to be wrapped around an operation sprocket, among the transmission sprockets 41 to 47, onto which the chain C is to be shifted when so intended. The holder H rotatably supports the guide pulley 72. The parallel link mechanism 73 has a pair of links 73a and 73b and serves as a swing mechanism which links the base portion 71 and the holder H together and moves the guide pulley 72 in the axial direction and in the radial direction of the rotational centerline L3, in response to a shift operation through the transmission operation mechanism 60. The tensioner 74 imparts a tension force to the chain C.

The holder H is constituted of first and second holders 76 and 77 which are coupled together with a pair of rivets 75a and 76a, and a support portion 78. The guide pulley 72 is rotatably supported by the first and second holders 76 and 77 with the support portion 78 which includes a collar 78a fixed to the outside of the rivet 75a and a bearing 78b rotatably supported by the collar 78a. A pair of first and second arms 86 and 87, which will be described later, are integrally press-fitted into an inner portion 78b1 of the bearing 78b.

With reference to FIGS. 2 and 4, the guide pulley 72, arranged above the ball spline mechanism 30 and the first and second covers 151 and 152, is located at a position which makes the shortest distance between the guide pulley 72 and the rotational centerline L1 of the crankshaft 12 to be smaller than the outer diameter d3 of the first sprocket 39 (FIG. 4). Specifically, in the entirety of the swing range, almost the whole of the guide pulley 72, including at least a wrapped portion C1, lies in a circle which has its center at the rotational centerline L1 and has a radius equal to d3 which is the outer diameter of the first sprocket 39.

With reference also to FIG. 3, the second holder 77 includes a coupling portion 79 and a spring housing portion 80. The pair of links 73a and 73b are pivotally attached and coupled to the coupling portion 79. The spring housing portion 80 houses tension springs 83. In the parallel link mechanism 73, the links 73a and 73b are pivotally attached to the base portion 71 with a pair of pins 81a and 81b that are provided to be in parallel with each other, and are pivotally attached to a pair of pins 82*a* and 82*b* that are provided in the coupling portion of the second holder to be in parallel with each other. Moreover, a return spring constituted of a tension coil spring (not shown) is provided to bridge the pins 81*a* and 82*b*.

The tensioner 74 includes: the tension pulley 82 which imparts a tension force to the chain C by pressing it between the first sprocket 39 and the guide pulley 72; the first and second arms 86 and 87 which are disposed between the first and second holders 76 and 77 to sandwich the guide pulley 72 in the axial direction and which rotatably support the tension pulley 82; and a tension spring 83 constituted of springs 83*a* and 83*b* which are formed of two return coil springs with different diameters. With their respective spring forces, the springs 83*a* and 83*b* urge the tension pulley 82 clockwise about the rotational centerline L4 in FIG. 2, thereby pressing the tension pulley 82 against the chain C.

When the operating force from the transmission operation member 61 has not yet worked on the inner cable 62*b* coupled to the coupling portion 73*b*1, the parallel link mechanism 73 occupies the standard gear position, i.e., the maximum-speed gear position indicated by the solid lines in FIGS. 2 and 3. Then, as an operation sprocket, the transmission sprocket 47 is selected. When the transmission operation member 61 is operated and the operating force according to the gear position has worked on the inner cable 62*b*, the parallel link mechanism 73 swings by having the pins 81*a* and 81*b* at the swing center and moves the guide pulley 72 along the addendum circle group composed of the addendum circles of the transmission sprockets 41 to 47. At this time, the links 73*a* and 73*b*, the holders 76 and 77, the arms 86 and 87 and the tension pulley 82 swing together with the guide pulley 72, and move in the axis and radial directions toward an operation sprocket, which is the transmission sprocket onto which the chain C has to be shifted. At the same time, the chain C moves in the axial direction toward the transmission sprocket onto which the chain C has to be shifted. When they occupy the minimum-speed gear position indicated by the chain double-dashed lines in FIGS. 2 and 3, the transmission sprocket 41 is selected as an operation sprocket.

For this reason, the derailer 70; or more precisely, the links 73*a* and 73*b*, the holders 76 and 77, the guide pulley 72, the arms 86 and 87 and the tension pulley 82; can move within the swing range when they are operated by the transmission operation mechanism 60. The swing range here is defined by a first limitation position as the maximum-speed gear position, and a second limitation position as the minimum-speed gear position.

Thus it will be seen that when a rider drives the crankshaft 12 in the forward rotational direction A0 or where the bicycle B moves forward while the rotation of the crankshaft 12 is stopped or the crankshaft 12 is rotated backward, the operation of transmission operation member 61 enables the followings: the first and second holders 76 and 77, the guide pulley 72, the first and second arms 86 and 87 and the tension pulley 82, which composes the derailer 70, occupy the maximum-speed gear position (here, seventh-speed gear) as the standard gear position indicated by the solid lines in FIGS. 2 to 4; the transmission sprocket 47 as the operation sprocket is selected among the sprocket cluster 40; and the chain C is wrapped around the first sprocket 39 indicated by the solid lines in FIGS. 3 and 4, and around the transmission sprocket 47. By way of the one-direction clutch 30 and the ball spline mechanism 31, the forward rotation of the crankshaft 12 drives the first sprocket 39 to rotate. By way of the chain C, the first sprocket 39 then drives the transmission sprocket 47, the output shaft 15 and the drive sprocket 17 to rotate at the gear ratio determined by the sprockets 39 and 47. The drive sprocket 17 then drives the driven sprocket 18 and the rear wheel Wr to rotate by way of the chain 19.

When the transmission operation member 61 is operated in order to select, as an operation sprocket, a lower-speed transmission sprocket, e.g., the transmission sprocket 41, among the transmission sprockets 41 to 46 for the purpose of shifting the gear position from this maximum-speed gear position, the inner cable 62*b* operates the parallel link mechanism 73 of the derailer 70. Thus, the parallel link mechanism 73 causes the first and second holders 76 and 77, the guide pulley 72, the first and second arms 86 and 87 and the tension pulley 82 to move leftwards in the axial direction and outwards in the radial direction from the rotational centerline L3. In this way, they are lead to the lower-speed gear position, here first-speed gear, as indicated by the chain double-dashed lines in FIGS. 2 to 4. The chain C moving leftwards along both with the guide pulley 72 and with the tension pulley 82 causes the first sprocket 39 to move leftwards in the axial direction along the main shaft 12*a* of the crankshaft 12. Accordingly, the first sprocket 39 moves to a position as indicated by the chain double-dashed lines in FIGS. 3 and 4. At this time, the chain C is wrapped around the transmission sprocket 41 and thereby the transmission sprocket 41 is coupled to the first sprocket 39 through the chain C in a driven manner.

Additionally, when the transmission operation member 61 is operated in order to select, among the sprockets 42 to 47, one transmission sprocket located in the gear position that can produce higher speed than the first gear position, the inner cable 62*b* operates the parallel link mechanism 73 of the derailer 70. Accordingly, the parallel link mechanism 73 causes the first and second holders 76 and 77, the guide pulley 72, the first and second arms 86 and 87 and the tension pulley 82 to move rightwards in the axial direction and inwards in the radial direction to the rotational centerline L3. The chain C moving rightwards along both with the guide pulley 72 and with the tension pulley 82 causes the first sprocket 39 to move rightwards along the main shaft 12*a*. Concurrently, the chain C is wrapped around a transmission sprocket which has been selected out of the transmission sprockets 42 to 47.

In that way, the derailer 70, operated in response to the transmission operation through the transmission operation mechanism 60, shifts the chain C among the transmission sprockets 41 to 47. Thus, the bicycle B runs with a gear ratio that is determined by the selected operation sprocket and the first sprocket 39 both of which the chain C is wrapped around.

In the torque transmission mechanism equipped with the one-direction clutch 20 with the ball spline mechanism 31 and with the first sprocket 39, the clutch outer body 22 and the inner member 31 are members separate from each other, and each of them has the clutch-side overlapped portion 26 and the slide-side overlapped portion 35 which are overlapped with each other when viewed in the axial direction. The guide grooves 36 are formed in the outer side surface of the inner member 31 to run along the axial direction, with their respective open ends 36*a* and 36*b* pointing in the axial direction. The clutch outer body 22 and the inner member 31 are coupled to each other at the overlapped portions 26 and 35 so that they can rotate integrally. The clutch-side overlapped portion 26 is arranged at a position where it is overlapped with the guide groove 36 when viewed in the axial direction. Thereby, the outer member 32 and the first sprocket 39 are prevented from moving toward the inner member 31 and the crankshaft 12 beyond the movement range in an axial direction thereof. Because the guide grooves 36, through which the outer member 32 and the first sprocket 39 are guided to move in the axial direction, are formed on the outer side surface of the inner member 31 along the axial direction by having their respective open ends 36a and 36b pointing in the axial direction, the guide grooves 36 can be more easily formed with mechanical processing than those with closed ends. For this reason, a wide choice of alternatives can be provided for the processing of the grooves and hence it is possible to process the guide grooves 36 with low-cost processing means, such as broaching. This leads to a reduction in the cost of the processing of the inner member 31 as well as the cost for the torque transmission mechanism. Movement of the outer member 32 and first sprocket 39 are limited in the axial direction beyond the movement range by adopting the configuration where a part of the clutch-side overlapped portion 26 is located at a position overlapped on the guide groove 36 when viewed in the axial direction. Thus, with this simple configuration using the clutch-side overlapped portion 26 for the guide grooves 36 having open ends 36a and 36b, the movement of the first sprocket 39 in the axial direction can be limited.

The balls 33 in the ball spline mechanism 30 are arranged between the inner member 31 and the outer member 32 and housed in the guide grooves 36 and 37 so as to be movable along the axial direction. The clutch-side overlapped portion 26 comes in contact with the balls 33 and limits their movement in the axial direction, whereby the outer member 32 is prevented from moving in the axis beyond the movement range. Thus, in the ball spline mechanism 30 provided with the balls 33 that are housed in the guide grooves 36 and 37, the clutch-side overlapped portion 26 that comes in contact with the balls 33 prevents the outer member 32 and the first sprocket 39 from moving in the axial direction beyond the movement range, as well as prevents the balls 33 from falling off from the guide grooves 36. Thus, with this simple configuration using the clutch-side overlapped portion 26, the movement of the first sprocket 39 in the axial direction can be limited, and additionally the balls 33 can be prevented from falling off.

The clutch outer body 22 includes the main body 25, of which the inner side surface is provided with the ratchet teeth 27 which the claws 23 engage. The maximum inner diameter d1 of the main body 25 is smaller than the minimum inner diameter d2 of the clutch-side overlapped portion 26. The ratchet teeth 27 are formed of the grooves 28 which are formed in the inner side surface of the main body 25 and extend along the axial direction, each of the grooves 28 having open ends pointing in the axial direction. For this reason, the ratchet teeth 27 can be formed with mechanical processing more easily than the ratchet teeth formed of grooves 28 having closed ends. Therefore, a wide choice of alternatives can be provided for the processing means of the ratchet teeth 27, and it becomes possible to process the ratchet teeth 27 with low-cost processing means such as broaching. As a result, in the clutch outer body 22 having the clutch-side overlapped portion 26, the ratchet teeth 27 with which the claws are engaged can be processed easily, leading to a reduction in the cost of the processing of the clutch outer body 22 as well as the cost for the torque transmission mechanism.

The clutch-side overlapped portion 26 is coupled by the coupling pins 100 to the slide-side overlapped portion 35 arranged at a position radially inward of the clutch-side overlapped portion 26. Each of the coupling pins 100 includes the clutch-side insertion portion 101 to be inserted into the insertion hole 120 formed in the clutch-side overlapped portion 26, and a slide-side insertion portion 102 to be inserted into the slit 140. The coupling pin 100 is provided with a step 103 formed at a position closer to the insertion portion 102 than to the insertion portion 101, the step 103 being unable to be inserted into the insertion hole 120. Thus, the clutch outer body 22 and the inner member 31 are coupled to each other with the coupling pins 100, each pin including the insertion portions 101 and 102 that are respectively inserted into the insertion hole 120 and the slit 140. The insertion hole and the slit 140 are provided in the overlapped portions 26 and 35, respectively, of each of the clutch outer body 22 and inner member 31. Thereby, the clutch outer body 22 and the inner member 31 can be coupled to each other with a simple configuration. Because each coupling pin 100 is provided with the step 103, the step 103 comes in contact with the clutch-side overlapped portion 26 when a centrifugal force, generated as a result of the rotation of the clutch outer body 22 and the inner member 31, works on the coupling pins 100. In this way, the coupling pins 100 can be prevented from moving in the radial direction toward the outside. As a result, with a simple configuration the coupling pins 100 can be prevented from being removed from both the inner member 31 and the clutch outer body 22 due to the rotation of the inner member 31 and the clutch outer body 22.

As noted, each of the coupling pins 100 has an insertion portion 102 to be inserted into the slit 140 formed in the slide-side overlapped portion 35. The slit 140 is formed in the axial end of the slide-side overlapped portion 35 and opens in the axial direction. The coupling pin 100 has the pair of contact plane surfaces 102a that respectively come in surface contact with the pair of contact plane surfaces 140a, which are part of the wall surfaces defining the slit 140 and which face each other in the circumferential direction. The coupling pin 100 is inserted into the slit 140 in the axial direction. Thus, because the torque transmission between the coupling pin 100 and the inner member 31 is conducted through these contact plane surfaces, a contact pressure of each contact portion of both of the contact planes is reduced. Further, since they come in plane contact with each other at their respective plane surfaces, the clutch outer body 22 and the inner member 31 can be coupled to each other with a simple configuration, and the rotation of the coupling pin 100 is prevented. Consequently, relative rotations between the coupling pin 100 and the inner member 31, and between the coupling pin 100 and the clutch outer body 22 are prevented, resulting in prevention of wearing caused by the relative rotations. Also, the formation of gaps, caused by wearing, between the coupling pin 100 and the inner member 31 and between the coupling pin 100 and the clutch outer body 22 are inhibited or prevented, and thereby the performance of integrally rotating clutch outer body 22 and the inner member 31 can be maintained for a long period of time. In addition, since the coupling pins 100 are inserted into the cylinder 31 in the axial direction, the clutch outer body 22 and the inner member 31 can be coupled easily using the coupling pins 100, improving the workability of the coupling operation.

In the transmission T, the inner member 31 of the ball spline mechanism 30 includes the guide surface S1 through which the outer member 32 is guided to move in the axial direction, and the outer member 32 is provided with the dust cover 150 which covers, no matter what position in the axial direction the first sprocket 39 is at, a region outside of the guide surfaces S1 and S2 in radial directions thereof. Thus, the dust cover 150 covers the guide surfaces S1 and S2 respectively of the guide grooves 36 and 37 in the ball spline mechanism 30 regardless of the axial position of the first sprocket 39 that moves in the axial direction. For this reason, foreign objects including abrasion powder generated as a result of the engagement of the chain C with the sprockets 39, and 41 to 47, or chain contact with the guide pulley 72 or the tension pulley 82 of the derailer 70, cannot enter the guide surfaces S1 and S2. Hence abrasion powder attachment to the guide surfaces S1 and S2 can be inhibited or prevented. Thus, when chain C movement in the axial direction causes the first sprocket 39, moving integrally with the outer member 32, to move in the axial direction, hindrance of the axial movement of the first sprocket 39 can be inhibited or prevented. Consequently, the first sprocket 39 can move in the axial direction more smoothly, and gears can be shifted more smoothly in the transmission T. Thus, it is possible to stretch the maintenance interval.

Because the dust cover 150 is formed into a cylinder enabling cover throughout the side surface of the inner member 31 and because dust cover 150 has the tapered portions 151c and 152c that taper toward their respective axial ends 151e and 152e, the inner member 31 is substantially fully covered. Thus, entry of foreign objects into the guide surfaces S1 and S2 is inhibited or prevented in the entire region of the inner member 31 in the circumferential direction. In addition, since the areas of the openings 153 and 154 formed in the dust cover 150 are reduced along the axial direction due to the presence of the tapered portions 151c and 152c, entry of foreign objects through the openings 153 and 154 is inhibited when the dust cover 150 moves in the axial direction integrally with the outer member 32. Thus, entry of foreign objects into the guide surfaces S1 and S2 is further inhibited or prevented, and consequently, the first sprocket 39 can move in the axial direction more smoothly, and gears can be shifted more smoothly in the transmission T.

Furthermore, because the first and second covers 151 and 152 can be attached to the outer member 32 by engaging the convex portions 151d and 152d with respective concave portions 32a and 32b formed on the outer surface of the outer member 32. extra attachment members are not required for the attachment of the first and second covers 151 and 152 to the outer member 32. Thus, it is possible to cut the cost for the transmission T.

The first and second covers 151 and 152 are located below the guide pulley 72. The guide pulley 72 is located at a position which makes the shortest distance between the guide pulley 72 and the rotational centerline L1 of the crankshaft 12 smaller than the outer diameter d3 of the first sprocket 39. Thus, when the chain C is shifted among the transmission sprockets, the dust cover 150 inhibits or prevents the entry of abrasion powder, falling from the guide pulley 72 into the guide surfaces S1 and S2 of the ball spline mechanism 30. For this reason, even though the guide pulley 72 is located at a position which makes the shortest distance between the guide pulley 72 and the rotational centerline L1 of the crankshaft 12 smaller than the outer diameter d3 of the first sprocket 39, and the first sprocket 39 and the guide pulley 72 are juxtaposed closely to each other, the entry of abrasion powder into the guide surfaces S1 and S2 can be inhibited or prevented with reliability thus ensuring smooth movement of the first sprocket 39 in the axial direction. Thus, it is possible to make the transmission T more compact. Furthermore, in the entirety of the swing range, almost the whole of the guide pulley 72, including at least a wrapped portion C1, lies in a circle which has its center at the rotational centerline L1 and has a radius equal to d3 which is the outer diameter of the first sprocket 39. Thus, the transmission T can be made further compact.

It will further be appreciated that modified embodiments may be had with regard to the above-described embodiment. For example, the outer-side engagement portions may be constituted of convex portions, and the cover-side engagement portions may be constituted of concave portions. Moreover, the dust cover 150 may be integrally molded with the outer member 32. Furthermore, the tapered portions 151c and 152c may not be provided with the end 151e and 152e, respectively. The tapered portion 151c may be formed closer to the base portion 151a than to the end 151e, and the tapered portion 152c may be formed closer to the base portion 152a than to the end 152e.

The dust cover 150 may include covering portions which correspond to the circumference-wise positions of the guide surfaces S1 and S2 and whose circumference-wise width is large enough to cover at least the guide surfaces S1 and S2. The covering portions can be provided along the circumferential direction with a space between each covering portion, the number of the covering portions being as many as the guide grooves 36 and 37.

The transmission case 90 may not be provided with the enclosed inside compartment 93 but include an opening that opens to the outside.

The sliding mechanism may be a spline which does not include coupling elements and is constituted of a plurality of annular protrusions extending along the axial direction and a plurality of grooves extending along the axial direction, into which the protruding portions are fitted. Either the coupling pins or the coupling elements may be integrally molded with the clutch outer body 22 or the inner member 31.

While a working example of the present invention has been described above, the present invention is not limited to the working example described above, but various design alterations may be carried out without departing from the spirit and scope of the present invention as set forth in the claims.

What is claimed is:

1. A transmission comprising:
   a sliding mechanism having an inner member capable of rotating integrally with a rotation shaft, and an outer member arranged outside of the inner member in a radial direction thereof, the outer member being capable of rotating integrally with the inner member and of moving toward the inner member in an axial direction thereof;
   a first sprocket which moves integrally with the outer member;
   a plurality of second sprockets arranged in the axial direction thereof;
   a shifting mechanism which shifts a chain wrapped around the first sprocket from one sprocket to another among the plurality of second sprockets,
   the transmission in which, in response to movement of the chain in the axial direction thereof at the time when the shifting mechanism shifts the chain, the first sprocket moves in the axial direction thereof integrally with the outer member,
   the inner member including a guide surface by which the outer member is guided to move in the axial direction thereof, and the outer member provided with a dust cover separate from the outer member,
   the dust cover comprising a first cover and a second cover, the first sprocket being disposed therebetween and covering the guide surface in a radial direction thereof no matter what position in the axial direction thereof the outer member is at.

2. The transmission according to clam 1, wherein,
   the inner member and the outer member are cylindrical;
   the dust cover is formed into a cylinder for covering all of the side surface of the inner member; and
   the dust cover further having tapered portions which taper toward their respective axial ends, leaving openings at their respective axial ends.

3. The transmission according to claim 2, wherein,
   the dust cover is a member separate from the outer member;

a cover-side engagement portion is formed on the inner surface of the dust cover, the cover-side engagement portion being engaged with an outer-side engagement portion formed on the outer surface of the outer member; and one of the outer-side engagement portion and the cover-side engagement portion is a convex portion, and the other one of the outer-side engagement portion and the cover-side engagement portion is a concave portion.

4. The transmission according to claim 2, wherein, the shifting mechanism comprises a guide pulley which guides the chain to a sprocket onto which the chain has to be shifted when the chain is intended to be shifted among the plurality of second sprockets;

the dust cover is located below the guide pulley; and the guide pulley is arranged at a position which makes the shortest distance between the guide pulley and a rotational centerline of the rotation shaft to be smaller than the outer diameter of the first sprocket.

5. The transmission according to claim 2, wherein the transmission further comprises a chain guide member for guiding a sagging chain, the chain guide member having a guide portion and a regulation portion, the guide portion forming an opening having a width slightly larger than that of the plurality of second sprockets in its axial direction, and including:

an inner guide portion arranged in a position toward an inside of a chain orbit from the opening, and an outer guide portion with a roller, arranged in a position toward an outside of the chain orbit from the opening;

the regulation portion limiting movement of the chain toward the inside of the chain orbit, when the chain is pulled out from one of the plurality of second sprockets.

6. The transmission according to claim 1, wherein, the shifting mechanism comprises a guide pulley which guides the chain to a sprocket onto which the chain has to be shifted when the chain is intended to be shifted among the plurality of second sprockets;

the dust cover is located below the guide pulley; and the guide pulley is arranged at a position which makes the shortest distance between the guide pulley and a rotational centerline of the rotation shaft to be smaller than the outer diameter of the first sprocket.

7. The transmission according to claim 1, wherein the transmission further comprises a chain guide member which guides a sagging chain, the chain guide member having a guide portion and a regulation portion, the guide portion forming an opening having a width slightly larger than that of the plurality of second sprockets in its axial direction, and including:

an inner guide portion arranged in a position toward an inside of a chain orbit from the opening, and an outer guide portion with a roller, arranged in a position toward an outside of the chain orbit from the opening;

the regulation portion limiting movement of the chain toward the inside of the chain orbit, when the chain is pulled out from one of the plurality of second sprockets.

8. A transmission comprising:

a sliding mechanism having an inner member capable of rotating integrally with a rotation shaft, and an outer member arranged outside of the inner member in a radial direction thereof, the outer member being capable of rotating integrally with the inner member and of moving toward the inner member in an axial direction thereof;

a first sprocket which moves integrally with the outer member;

a plurality of second sprockets arranged in the axial direction thereof;

a shifting mechanism which shifts a chain wrapped around the first sprocket from one sprocket to another among the plurality of second sprockets, wherein, in response to movement of the chain in the axial direction thereof at the time when the shifting mechanism shifts the chain, the first sprocket moves in the axial direction thereof integrally with the outer member;

the inner member including a guide surface by which the outer member is guided to move in the axial direction thereof, and the outer member is provided with a dust cover, the dust cover covering the guide surface in a radial direction thereof, regardless of the axial position of the outer member;

wherein:

the dust cover is a member separate from the outer member;

a cover-side engagement portion is formed on the inner surface of the dust cover, the cover-side engagement portion being engaged with an outer-side engagement portion formed on the outer surface of the outer member; and one of the outer-side engagement portion and the cover-side engagement portion is a convex portion, and the other one of the outer-side engagement portion and the cover-side engagement portion is a concave portion.

9. The transmission according to claim 8, wherein, the shifting mechanism comprises a guide pulley which guides the chain to a sprocket onto which the chain has to be shifted when the chain is intended to be shifted among the plurality of second sprockets;

the dust cover is located below the guide pulley; and the guide pulley is arranged at a position which makes the shortest distance between the guide pulley and a rotational centerline of the rotation shaft to be smaller than the outer diameter of the first sprocket.

10. A bicycle including a transmission apparatus, comprising:

a sliding mechanism having an inner member capable of rotating integrally with a rotation shaft, and an outer member arranged outside of the inner member in a radial direction thereof, the outer member being capable of rotating integrally with the inner member and of moving toward the inner member in an axial direction thereof;

a first sprocket which moves integrally with the outer member;

a plurality of second sprockets arranged in the axial direction thereof;

a shifting mechanism which shifts a chain wrapped around the first sprocket from one sprocket to another among the plurality of second sprockets, the transmission in which, in response to movement of the chain in the axial direction thereof at the time when the shifting mechanism shifts the chain, the first sprocket moves in the axial direction thereof integrally with the outer member, the inner member including a guide surface by which the outer member is guided to move in the axial direction thereof, and the outer member provided with a dust cover separate from the outer member, the dust cover comprising a first cover and a second cover, the first sprocket being disposed therebetween and covering the guide surface in a radial direction thereof no matter what position in the axial direction thereof the outer member is at.

11. The bicycle of claim 10, wherein,
the inner member and the outer member are cylindrical;
the dust cover is formed into a cylinder for covering all of the side surface of the inner member; and
the dust cover further having tapered portions which taper toward their respective axial ends, leaving openings at their respective axial ends.

12. The bicycle of claim 11, wherein,
the dust cover is a member separate from the outer member;
a cover-side engagement portion is formed on the inner surface of the dust cover, the cover-side engagement portion being engaged with an outer-side engagement portion formed on the outer surface of the outer member; and
one of the outer-side engagement portion and the cover-side engagement portion is a convex portion, and the other one of the outer-side engagement portion and the cover-side engagement portion is a concave portion.

13. The bicycle of claim 11, wherein,
the shifting mechanism comprises a guide pulley which guides the chain to a sprocket onto which the chain has to be shifted when the chain is intended to be shifted among the plurality of second sprockets;
the dust cover is located below the guide pulley; and
the guide pulley is arranged at a position which makes the shortest distance between the guide pulley and a rotational centerline of the rotation shaft to be smaller than the outer diameter of the first sprocket.

14. The transmission according to claim 11, wherein the transmission further comprises a chain guide member for guiding a sagging chain, the chain guide member comprising a guide portion and a regulation portion,
the guide portion forming an opening having a width slightly larger than that of the plurality of second sprockets in its axial direction, and including:
an inner guide portion arranged in a position toward an inside of a chain orbit from the opening, and
an outer guide portion with a roller, arranged in a position toward an outside of the chain orbit from the opening;
the regulation portion limiting movement of the chain toward the inside of the chain orbit, when the chain is pulled out from one of the plurality of second sprockets.

15. The bicycle of claim 10, wherein,
the dust cover is a member separate from the outer member;
a cover-side engagement portion is formed on the inner surface of the dust cover, the cover-side engagement portion being engaged with an outer-side engagement portion formed on the outer surface of the outer member; and
one of the outer-side engagement portion and the cover-side engagement portion is a convex portion, and the other one of the outer-side engagement portion and the cover-side engagement portion is a concave portion.

16. The bicycle of claim 15, wherein,
the shifting mechanism comprises a guide pulley which guides the chain to a sprocket onto which the chain has to be shifted when the chain is intended to be shifted among the plurality of second sprockets;
the dust cover is located below the guide pulley; and
the guide pulley is arranged at a position which makes the shortest distance between the guide pulley and a rotational centerline of the rotation shaft to be smaller than the outer diameter of the first sprocket.

17. The bicycle of claim 10, wherein,
the shifting mechanism comprises a guide pulley which guides the chain to a sprocket onto which the chain has to be shifted when the chain is intended to be shifted among the plurality of second sprockets;
the dust cover is located below the guide pulley; and
the guide pulley is arranged at a position which makes the shortest distance between the guide pulley and a rotational centerline of the rotation shaft to be smaller than the outer diameter of the first sprocket.

18. The transmission according to claim 10, wherein the transmission further comprises a chain guide member for guiding a sagging chain, the chain guide member having a guide portion and a regulation portion,
the guide portion forming an opening having a width slightly larger than that of the plurality of second sprockets in its axial direction, and including:
an inner guide portion arranged in a position toward an inside of a chain orbit from the opening, and
an outer guide portion with a roller, arranged in a position toward an outside of the chain orbit from the opening;
the regulation portion limiting movement of the chain toward the inside of the chain orbit, when the chain is pulled out from one of the plurality of second sprockets.

* * * * *